(12) United States Patent
Van Vleck et al.

(10) Patent No.: US 9,165,317 B2
(45) Date of Patent: *Oct. 20, 2015

(54) METHODS, SYSTEMS, AND PRODUCTS FOR MANAGING DIGITAL CONTENT

(75) Inventors: Paul F. Van Vleck, Austin, TX (US);
Dinesh Nadarajah, Austin, TX (US);
David Patron, Cedar Park, TX (US);
Michael F. Grannan, Austin, TX (US)

(73) Assignee: RAKUTEN, INC., Tokyo (JP)

( * ) Notice: Subject to any disclaimer, the term of this patent is extended or adjusted under 35 U.S.C. 154(b) by 330 days.

This patent is subject to a terminal disclaimer.

(21) Appl. No.: 13/167,745

(22) Filed: Jun. 24, 2011

(65) Prior Publication Data
US 2012/0331558 A1    Dec. 27, 2012

Related U.S. Application Data

(63) Continuation of application No. 10/191,624, filed on Jul. 10, 2002, now Pat. No. 7,996,503.

(51) Int. Cl.
*G06F 12/14* (2006.01)
*G06F 12/00* (2006.01)
(Continued)

(52) U.S. Cl.
CPC ...................................... *G06Q 30/06* (2013.01)

(58) Field of Classification Search
USPC .......................... 726/26, 29, 2; 380/200, 277
See application file for complete search history.

(56) References Cited

U.S. PATENT DOCUMENTS

| 5,572,442 A | 11/1996 | Schulhof et al. |
| 5,682,325 A | 10/1997 | Lightfoot et al. |

(Continued)

FOREIGN PATENT DOCUMENTS

| WO | WO 99/45491 | 9/1999 |
| WO | WO 00/30323 | 5/2000 |
| WO | WO 02/01330 | 1/2002 |

OTHER PUBLICATIONS

"Digital Rights Management as Information Access Barrier" —Puckett et al, Georgia State Univ., Oct. 2010 http://scholarworks.gsu.edu/cgi/viewcontent.cgi?article=1049&context=univ_lib_facpub.*

*Primary Examiner* — Randy Scott
(74) *Attorney, Agent, or Firm* — Hubbs, Enatsky & Inoue PLLC

(57) ABSTRACT

A dynamic repository (either storing digital data content or pointers to stored digital data content) works in conjunction with a plurality of interfaces to manage digital content and digital rights policies associated with one or more users. Digital rights policies are unique to each user and such policies define access to digital content in the repository. The user's digital rights policy indicates the level of access a user has to digital content in the repository (e.g., the policy could indicate that the user has authorized access to a particular file for a period of seven days). The interfaces linked with the content repository are used to access and manipulate the digital data content (based upon each user's digital rights policy) and the digital rights policies stored in the content repository. The interfaces include: (a) one or more authentication interfaces for authenticating users, (b) one or more digital rights management (DRM) interfaces allowing users to add, delete, or edit the digital rights policies, (c) one or more data access interfaces allowing users to selectively access digital data content as defined by their individual digital rights policy, (d) one or more browsing interfaces allowing users to selectively browse said digital data content, or a (e) one or more content manipulation interfaces allowing said users to add, delete, or edit said digital data content.

20 Claims, 7 Drawing Sheets

(51) Int. Cl.
   *G06Q 40/00* (2012.01)
   *G06Q 30/06* (2012.01)

(56) References Cited

U.S. PATENT DOCUMENTS

| | | | |
|---|---|---|---|
| 6,891,953 | B1 | 5/2005 | DeMello et al. |
| 7,043,453 | B2 | 5/2006 | Stefik et al. |
| 7,231,450 | B1 * | 6/2007 | Clifford et al. ............... 709/229 |
| 2001/0013120 | A1 | 8/2001 | Tsukamoto |
| 2001/0037360 | A1 | 11/2001 | Ekkel |
| 2001/0039662 | A1 | 11/2001 | Sibley |
| 2001/0044747 | A1 | 11/2001 | Ramachandran et al. |
| 2002/0007351 | A1 * | 1/2002 | Hillegass et al. ............... 705/59 |
| 2002/0091848 | A1 | 7/2002 | Agresta et al. |
| 2003/0002668 | A1 * | 1/2003 | Graunke et al. ............... 380/45 |
| 2003/0233281 | A1 * | 12/2003 | Takeuchi et al. ............... 705/26 |
| 2006/0190404 | A1 * | 8/2006 | Stefik et al. ............... 705/51 |
| 2008/0016081 | A1 * | 1/2008 | MacMillan et al. ............ 707/10 |
| 2010/0061549 | A1 * | 3/2010 | Seo et al. ............... 380/42 |
| 2010/0306247 | A1 | 12/2010 | Sidman |

\* cited by examiner

METHODS, SYSTEMS, AND PRODUCTS FOR MANAGING DIGITAL CONTENT

CROSS-REFERENCE TO RELATED APPLICATIONS

This application is a continuation of U.S. patent application Ser. No. 10/191,624, filed Jul. 10, 2002, now issued as U.S. Pat. No. 7,996,503 and incorporated herein by reference in its entirety.

BACKGROUND OF THE INVENTION

1. Field of Invention

The present invention relates generally to the field of content storage. More specifically, the present invention is related to creating varying levels of access for specialized data content.

2. Discussion of Prior Art

With the advent of ubiquitous, broadband networks, it has become increasingly popular to purchase digital content (such as music, video, software, etc.) and to receive the content using downloadable computer files or online data streams rather than using physical media (such as CDs or VHS tapes). As this type of interaction becomes more common, new types of infrastructure will need to be developed to help manage this process, to make it easier to use and to make it more cost effective.

FIG. 1 illustrates a prior art content delivery system wherein a user is able to use a computer-based device (e.g., a personal computer (PC) 110, laptop 112, pen-based computer 113, wireless telephone 114, personal digital assistant (PDA) 116, pager 118, etc.) to establish a communication link with one or more content providers 102, 104, and 106 over a network 108 (e.g., local area network (LAN), wide area network (WAN), Internet, etc.). In this scenario, users are able to request and download various types of digital content (over network 108) from the content providers 102, 104, and 106 onto their computer-based device.

A popular type of digital content that is requested for download is multimedia digital content such as audio (e.g., MP3's) and video content (e.g., MPEG4). Digital content providers offer various online services wherein users are able to request and download multimedia content over a network such as the Internet. These types of services are convenient to users who are interested in downloading digital content onto their computer-based devices (as long as their computer-based device is capable of communicating with the content provider over a network such as the Internet).

In the instance that users are not at their home or office and are interested in purchasing digital content, but do not have access to their Internet connection, they are limited to purchasing physical media at various physical locations, such as a music store. At the music store, they are provided with a choice of purchasing the physical media with the multimedia content (e.g., a music CD). When users are interested in purchasing digital content related to a product of interest (as opposed to purchasing the physical media itself), they must go to a physical location such as their home or office that has access to the Internet to perform a financial transaction before downloading the digital content onto their computer-based device.

Some music stores have headsets to preview music. These previews, however, are very limited in duration, and multimedia content associated with such previews are not presented in their entirety. Thus, in the example of a music store, if a user is interested in a particular album, he/she can press a button corresponding to the album and be able to preview segments of certain songs in the album.

A problem faced by vendors of digital content (e.g., multimedia content), is that currently each must independently develop mechanisms for content delivery and Digital Rights Management (DRM). This is both costly to provide and is difficult for consumers to use as they must deal with a variety of different interfaces and access methods in order to obtain their goods.

In addition, current methods tend to constrain to way in which online media is purchased. Traditionally, for example, digital goods that are purchasable via online transactions require a network connection in order to access these goods. From an end user's perspective, however, it would be more convenient and simpler if the method by which people purchase digital goods is independent of the good's delivery mechanism.

Similarly, the type of device used to purchase digital goods should be independent of the device used to access these goods. It should be possible, for example, to use a wireless web device to purchase a high-resolution video regardless of whether the device has sufficient bandwidth to view the video or enough storage capacity to save it locally. The consumer may wish to purchase the video for later viewing on another device with a higher speed connection or may simply want to automatically download the content to another device such as a home server.

The following references provide a general description of digital content providers that allow digital content to be downloaded.

The U.S. patent to Schulhof et al. (U.S. Pat. No. 5,572,442), assigned to Information Highway Media Corporation, provides a system for distributing subscription and on-demand audio programming. Disclosed is a system for downloading digital audio data onto a portable audio storage medium and listening to it at a desired time. The portable audio storage medium is capable of high-speed data transfer that can be downloaded from such systems as a television cable system, satellite, or fiber optic telephone link.

The published U.S. patent application to Tsukamoto (2001/0013120A1), assigned to NEC Corporation, provides for a digital content rental system. Disclosed is a process that consists of a customer visiting the store with a portable storage unit, such as a magnetic disk. The user may then choose from a plurality of digital content and download the desired content onto his/her storage medium.

The published U.S. patent application to Ekkel (2001/0037360A1), assigned to Koninklijke Philips Electronics N.V., provides for data service at a transit terminal. Disclosed is a system that provides information content to a user at a repository. While a consumer is traveling, a data service offers information availability that can be downloaded by the user to a storage device to be viewed offline. Using a mobile storage medium such as a memory card or a magnetic disk, the individual may use the highly customizable service to download electronic information content from a host repository or server.

The published U.S. patent application to Sibley (2001/0039662A1), assigned to Hughes Electronics Corporation, provides for a digital over-the-air communication system for use with a digital terrestrial broadcasting system. Disclosed is a system for distributing electrical content using digital over-the-air communication. The process consists of a network operation center uplinking electronic content packages to a satellite, a broadcast center receiving the electronic content from the satellite, and a user device receiving the digital content via a digital channel generated by the broadcast center.

The published U.S. patent application to Ramachandran et al. (2001/0044747A1), assigned to Diebold, Incorporated, provides for a system and method for dispensing digital information from an automated transaction machine. Disclosed is a service that offers digital content information to a user through an automated transaction machine.

Whatever the precise merits, features, and advantages of the above-cited references, none of them achieve or fulfill the benefits of the present invention.

SUMMARY OF THE INVENTION

The present invention provides for a dynamic content repository (either storing digital data content or pointers to stored digital data content) working in conjunction with a plurality of interfaces to manage digital content and digital rights policies associated with one or more users. Digital rights policies are unique to each user and such policies define access to digital content in the repository. For example, a user is able to visit a music store and purchase various levels of access (e.g., 1-day limited access, 1-week limited access, unlimited access, etc.) to digital data content of interest (e.g., music content) and, upon successful completion of a financial transaction (such as a credit card account associated with the user for an amount associated with the data content of interest and any identified levels of access), a copy (or a pointer) of the digital data content of interest is transferred to a storage space in the repository that is unique to the user. Additionally, the user's digital rights policy is updated to indicate the level of access. In another embodiment, instead of transferring a copy of the digital data content of interest to the user's storage space, a pointer to the location of the digital data content of interest is transferred to the user's storage space. Furthermore, in an extended embodiment, parameters associated with the account (e.g., credit card account) are used in identifying the unique storage space associated with the consumer.

The interfaces associated with the content repository comprise: (a) one or more authentication interfaces authenticating users, identifying a digital rights policy associated with each of said users, and identifying the user's authority to manipulate the digital data content and digital rights policies; (b) one or more digital rights management (DRM) interfaces allowing users to add, delete, or edit digital rights policies; (c) one or more data access interfaces allowing users to selectively access said digital data content as defined by their individual digital rights policy; (d) one or more browsing interfaces allowing said users to selectively browse said digital data content as defined by their individual digital rights policy and to browse the content of their digital rights policy; and/or a (e) one or more content manipulation interfaces allowing said users to add, delete, or edit said digital data content, wherein the content manipulation is performed on selectively accessible digital data content as defined by said user's digital rights policy.

DESCRIPTION OF THE PREFERRED EMBODIMENTS

Figure 1:
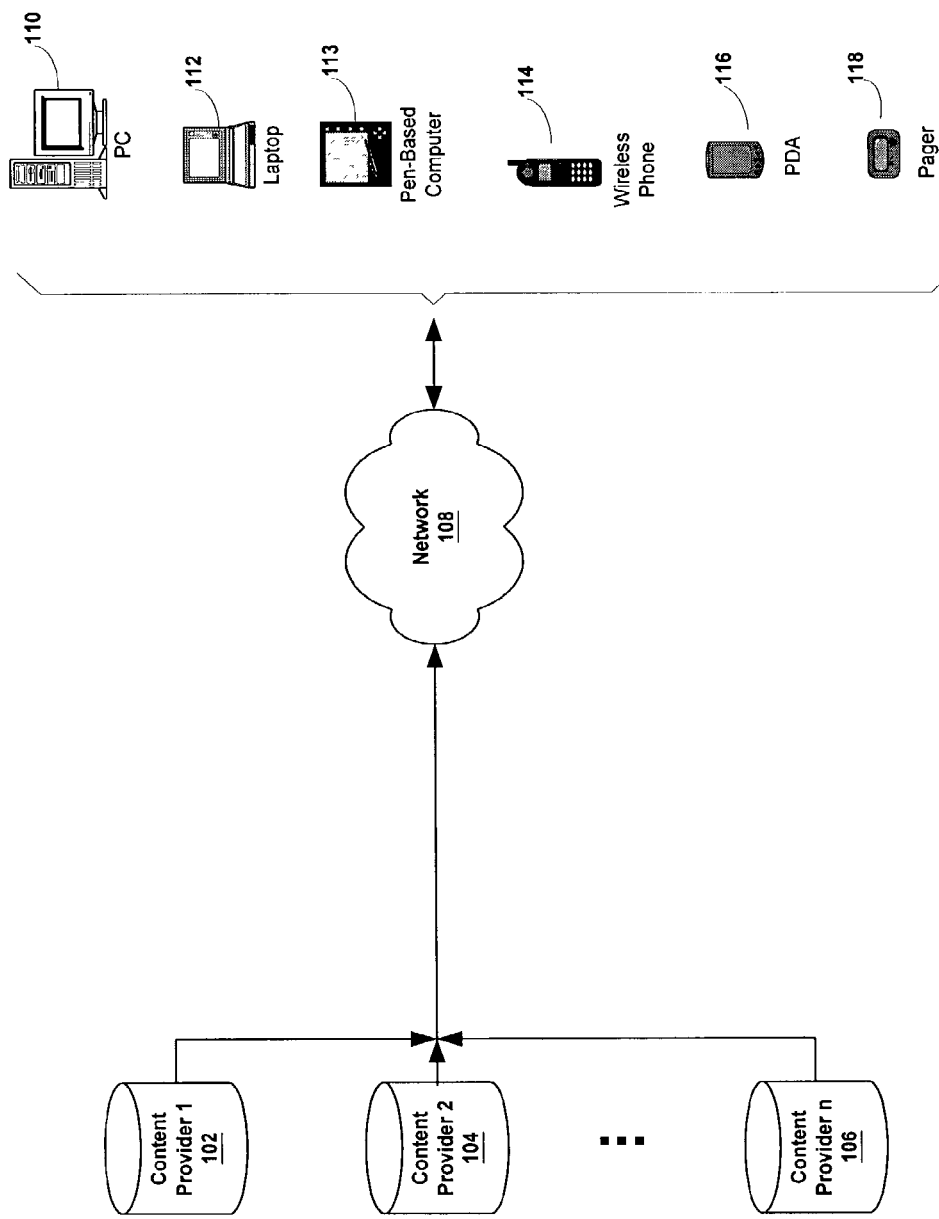
FIG. 1 illustrates a prior art content delivery system wherein a user is able to use a computer-based device to establish a communication link with one or more content providers over a network.

While this invention is illustrated and described in a preferred embodiment, the invention may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
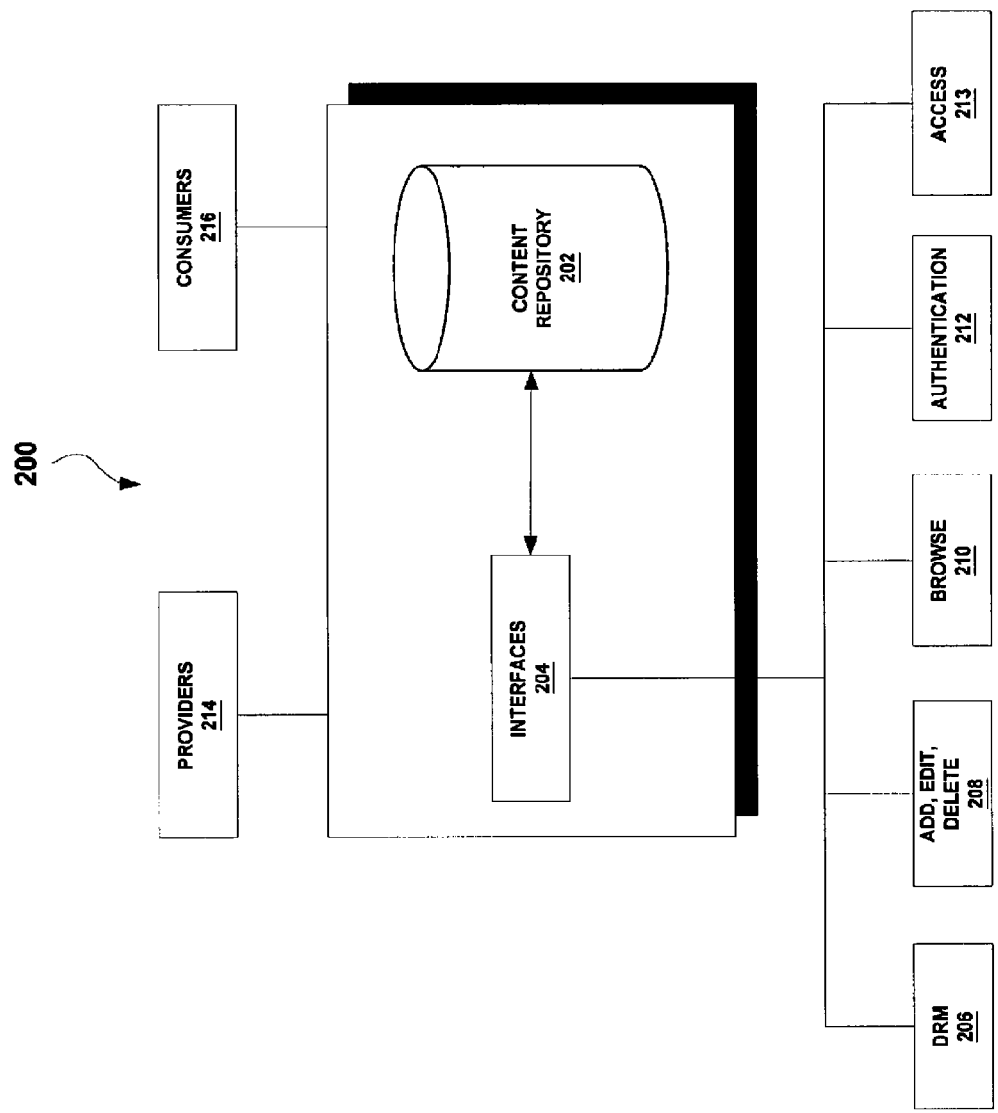
FIG. 2 illustrates an overview of the system of the present invention comprising a content repository operatively linked with one or more interfaces for accessing and manipulating digital content in the content repository.

FIG. 2 illustrates an overview of the system 200 of the present invention comprising a content repository 202 operatively linked with one or more interfaces 204 for accessing and manipulating digital content in the content repository 202. The content repository 202 either stores data content or stores pointers to where data content can be accessed. The interfaces 204 include, but are not limited to, one or more digital rights management interfaces 206, one or more editing interfaces 208, one or more browsing interfaces 210, one or more authentication interfaces 212 and one or more access interfaces 213. Providers of data content 214 and consumers of such data content 216 are able to interact with the content repository 202 via these interfaces 204.

Figure 3:
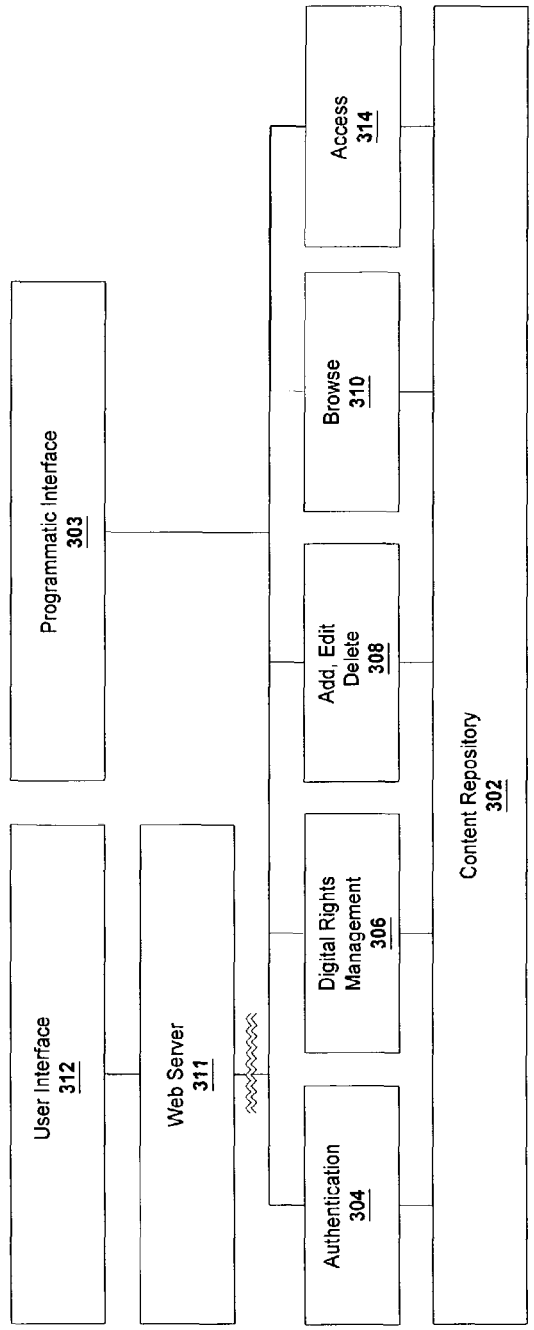
FIG. 3 shows a specific implementation of the present invention's content repository including interfaces.

FIG. 3 shows a specific implementation of the content repository including interfaces (hereon, electronic trunk). In this example, the electronic trunk is implemented as a web-based service in order to facilitate digital content delivery over the Internet. At the core of the electronic trunk's architecture is a content repository 302. The content repository 302 is similar to simple disk storage that has been made remotely accessible over a network connection. Unlike this type of simple disk storage in which any type of data file can be stored, the electronic trunk is used for the storage of more specialized data, namely: digital content such as audio, video and software files. Depending upon the implementation and type of content, the repository 302 may contain the data files themselves, an address (such as an Uniform Resource Locator or URL) pointing to the data files located on other computers, or an address (e.g., URL) pointing to a server designed to stream the content to the user. Regardless of which storage mechanism is used, the content repository 302 acts as a directory of various types of specialized digital content associated with one or more users, wherein a user's access to such content is defined by the user's digital rights policy.

The electronic trunk is further distinguished from simple disk storage by the implementation of various interfaces that are used to access and manipulate the contents of the repository. It should be noted that, although FIGS. 2 and 3 shows five basic interfaces, one skilled in the art can envision using other interfaces without departing from the scope of the present invention. These interfaces, in one embodiment, are implemented as programmatic interfaces using web service technologies using standards, such as SOAP and XML (a brief description of each of these standards is given below). A simple web-based user interface could then be layered on top of the programmatic interface 303. For example, users are able to access the interfaces over a web server 311, via user interface 312.

SOAP, or Simple Object Access Protocol, provides a way for applications to communicate with each other over the Internet independent of platform. SOAP piggybacks a Document Object Model (DOM) onto HTTP (port 80) in order to penetrate server firewalls, which are usually configured to accept port 80 and port 21 (FTP) requests.

XML, or Extensible Markup Language, is a specification developed by the W3C. XML is a pared-down version of SGML, designed especially for web documents. It allows designers to create their own customized tags, enabling the definition, transmission, validation, and interpretation of data between applications and between organizations. It should be noted that SOAP relies on XML to define the format of the information and then adds the necessary HTTP headers to send it.

In the preferred embodiment, the electronic trunk would implement an editing interface 308 to add, edit, or delete, and a browser interface 310 to browse information stored in the repository. In addition, an authentication interface 304 is implemented to enable one or more authentication schemes that would identify the user and that user's rights when manipulating items in the repository.

Additionally, the DRM interface 306 implements one or more Digital Rights Management (DRM) schemes. Each piece of content in the repository can now have a digital rights policy associated with it that is configured and enforced by the DRM. Like the content itself, the digital rights policy can be added, edited, or deleted based upon the permissions associated with a particular user.

One or more access interfaces 314 would enable access to the digital content, as allowed by the associated digital rights policy, using a variety of methods and from a variety of devices. It is this combination of interfaces that allows the electronic trunk to act as a middleman between content providers and content consumers. At the simplest level, users of the electronic trunk could be divided into two categories—providers and consumers, each with a different set of access rights to the content and its associated policies.

Figure 4:
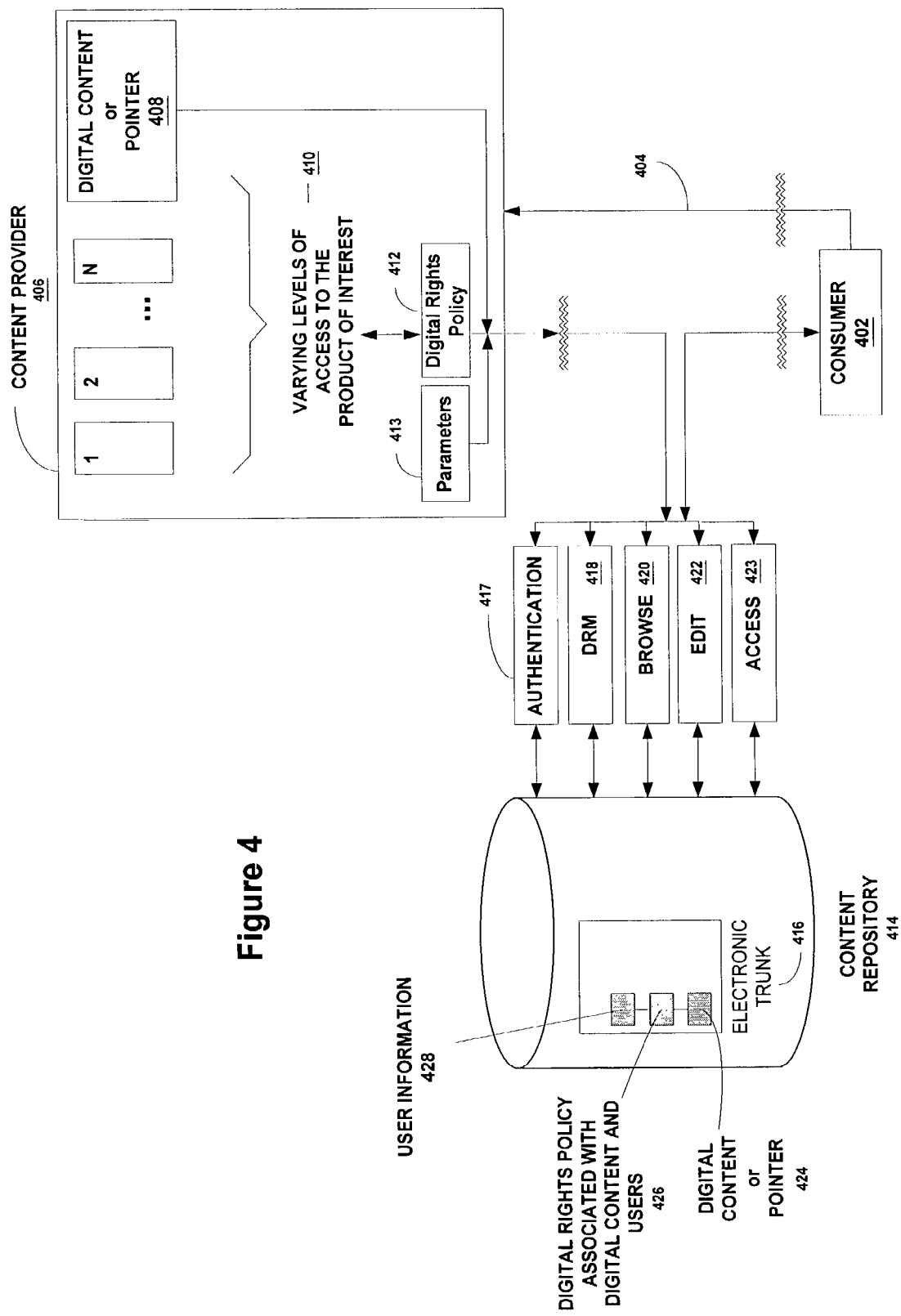
FIG. 4 illustrates an example wherein the system of the present invention is used in conjunction with a POS terminal for allowing varying levels of access to a product of interest.

FIG. 4 illustrates an example of a system interaction diagram showing the interaction between a content provider and the present invention's content repository. In this example, a consumer 402 establishes a link 404 with a content provider 406 offering digital content of interest to consumer 402. It should be noted that consumer 402 can access the content provider 406 via various devices including, but not limited to: PCs, laptops, personal digital assistants (PDAs), pagers, kiosks, or pen-based computers. Additionally, a simple scenario wherein the consumer is able to physically access the content provider's location (such as a store) is also envisioned.

After link 404 is established, consumer 402 identifies a digital content of interest 408 and an associated level of access (e.g., one-day limited access to digital content of interest or unlimited access to digital content of interest) 410. Next, a financial transaction occurs between the consumer 402 and the content provider 406, and upon successful completion of the transaction, the content provider 406 associates the identified level of access with a digital rights policy (implemented via a DRM model) 412, and transmits a copy of the digital content of interest 408, the digital rights policy 412 associated with the digital content of interest, and a unique parameter 413 uniquely associated with the consumer (e.g., a credit card number of consumer) to the content repository 414. It should be noted that in another embodiment, instead of transmitting a copy of the digital content of interest, a pointer or a copy of a pointer (such as an uniform resource locator or URL) is transmitted for storage in the content repository 414.

Upon reception of the transmitted information, the content provider authenticates the consumer based on the unique parameter 413, and uses this information to identify the location of a unique storage space or electronic trunk 416 associated with the consumer. Next, the digital data content of interest 408 and any associated digital rights policy 412 are stored in the electronic trunk 416 with the help of a plurality of interfaces (including one or more authentication interfaces 417, one or more DRM interfaces 418, one or more browsing interfaces 420, one or more content manipulation interfaces 422, and one or more data access interfaces 423).

An example is provided to illustrate the functionality of the system of the present invention. In this example, a consumer 402 walks into a music store to browse its audio selections. The store sells audio CDs, as well as varying levels of access to online music 410. A slip of paper with a barcode is placed beside each CD, wherein this paper is used to purchase the music associated with the CD for online delivery (instead of the physical CD itself).

In addition, there is a second slip of paper beside each CD that will allow the user to purchase (via POS transaction at a POS terminal) the music online for a lower price, but with time limitations on user's ability to access the content (e.g., seven days' worth of access). Thus, if the consumer decides that the music from a particular artist looks interesting, he/she can decide to sample the music before paying full price. Next, the consumer takes the slip of paper with the seven-day barcode to the cash register (e.g., a POS terminal), where the purchase is completed. The consumer uses a credit card that has been registered with one of the electronic trunk's authentication schemes to make the purchase.

The computers at the music store are able to map the barcode on the slip of paper to a particular piece of digital content (in this case, some particular music files) 408 and its associated rights policy (e.g., unlimited access but for only seven days) 410. Based on the credit card information, the computers are also able to identify the account of the electronic trunk consumer who made the purchase by matching it with user information 428 stored in the electronic trunk. The music store logs into the electronic trunk using one of the online authentication schemes (implemented via authentication interface 312 of FIG. 3). Furthermore, the store itself can have a unique storage space in the repository wherein all the digital content (or pointers to such content) associated with the store is located. Alternatively, the digital content (or pointers to such content) can be transferred to the repository as needed based upon customer purchases. Thus, the store acts as a content provider (as it has access to the digital multimedia content and provides such content based upon financial transactions with users) and has the ability to browse (via a browser interface 316 of FIG. 3), add, and edit (via an editing interface 318 of FIG. 3) both the content and its associated rights policies in its unique storage space (in the repository). It does not, however, have the right to access or modify any content placed in the repository by any other content provider. Using credit card information, the music store is able to identify the account associated with the user who purchased the music. The music store uploads the necessary files 424 into the electronic trunk 416 and associates the digital rights policy (e.g., a seven-day rights policy) 426 with it.

Meanwhile, consumers 402 are able to go to other physical locations, such as their home or office, to access their electronic trunk through their web browser in order to listen to the music they have purchased. As content consumers, they are able to browse and delete any content located in their accounts that may have been obtained from a variety of different content providers. They are not allowed, however, to modify or delete the rights policy associated with the content. Later, the consumer launches an audio player on his computer and listens to his music. Furthermore, in the instance that the valid time period (as defined in the digital rights policy of the user) for data content access expires (e.g., seven days have passed since the purchase of a seven-day policy associated with a specific digital music content), the DRM system (implemented via a DRM interface 306 and access interface 314 of FIG. 3) no longer allows access to the music content. To avoid this scenario, the consumer can either delete or renew (the digital rights policy) the expired data content from his/her account.

Figure 5A:
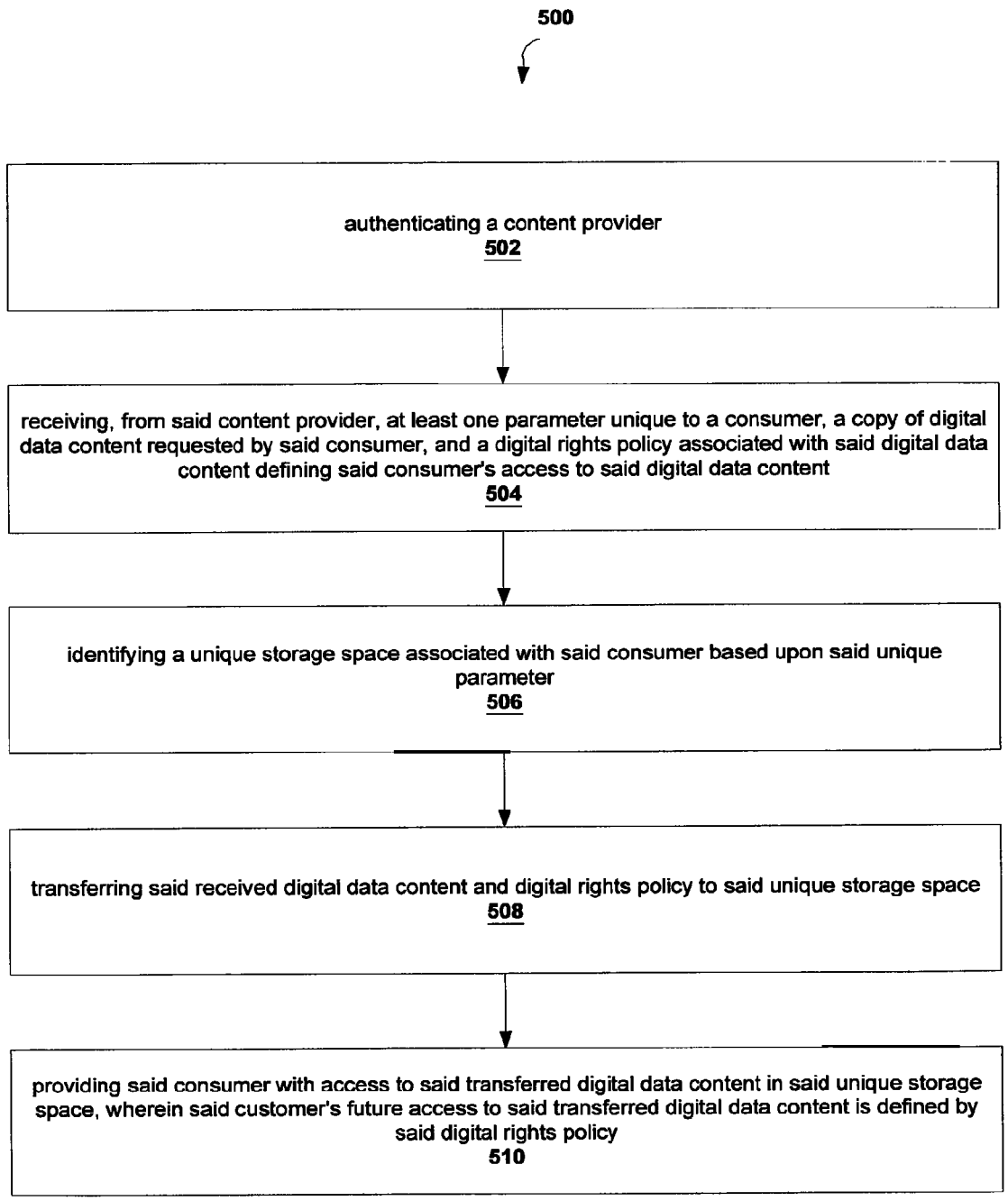
FIGS. 5a and 5b collectively illustrate the method associated with the present invention.
Figure 5B:
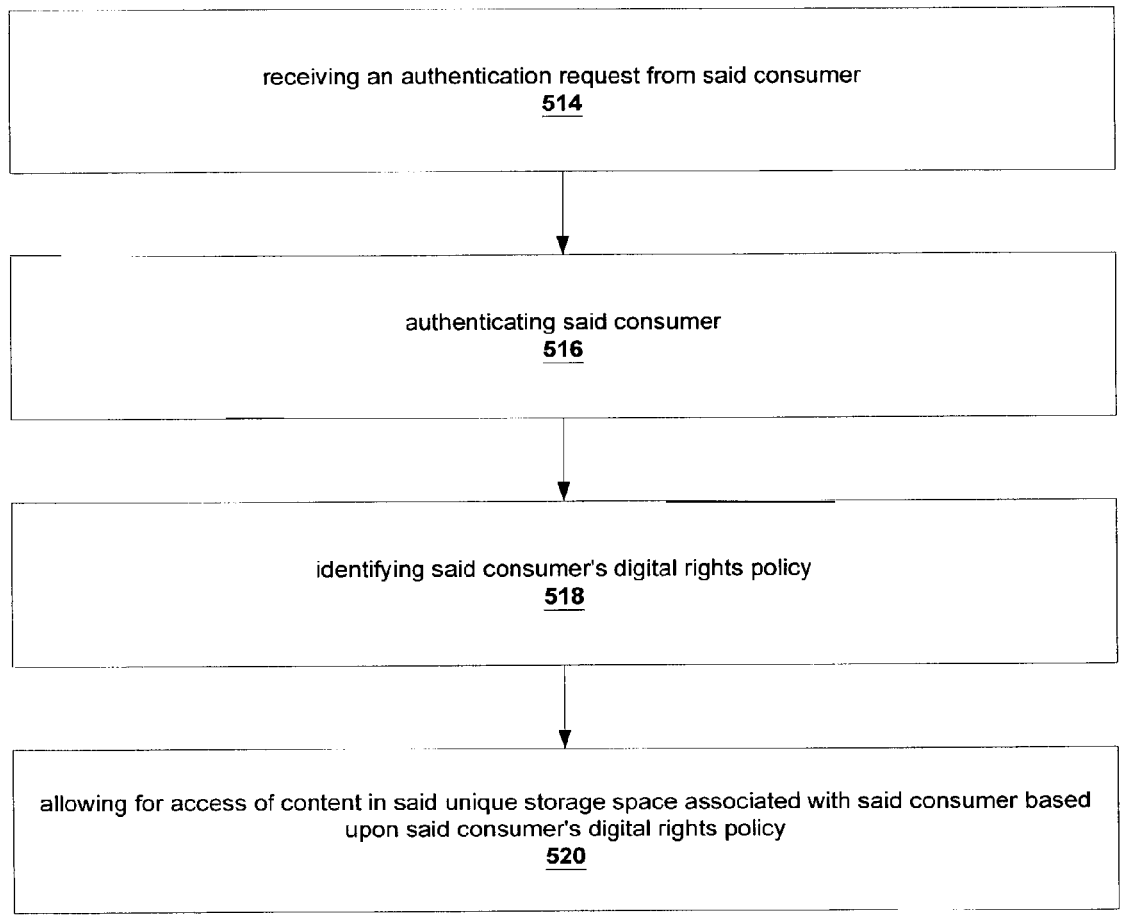

FIGS. 5a and 5b collectively illustrate the method 500 associated with the present invention. First, the authentication interface associated with the content repository receives an authentication request from a content provider (e.g., a music store). Next, in step 502, the content provider is authenticated. In step 504, the content repository receives: a unique parameter associated with a consumer, a copy of digital data content of interest to the consumer, and a digital rights policy associated with the digital data content defining the consumer's access to the digital data content.

In step 506, a unique storage space associated with the consumer is identified in the repository, wherein the identification is based upon the unique parameter associated with the consumer. Next, in step 508, the received digital data content and the associated digital rights policy is transferred to the unique storage space. Furthermore, in step 510, the consumer is provided access to the transferred digital data content in the storage space unique to him/her, wherein the consumer's future access to the digital data content is defined by the digital rights policy.

FIG. 5b illustrates how consumers access their electronic trunk from a location such as their home or office. In step 514, an authentication request is received from said consumer; in step 516, the consumer is authenticated. In step 518, the consumer is allowed to access or manipulate the content in the consumer's unique storage space as defined by the consumer's digital rights policy. Thus, the consumer is not able to edit data content of storage space belonging to other users.

Although all throughout the above description of the method associated with the present invention, a POS terminal is used for the purposes of creating varying levels of access to digital data content of interest, one skilled in the art can envision using devices via which such transactions can be performed. For example, such transaction can be performed via any computer-based device such as, but not limited to: portable computers (laptops), PDAs, pagers, telephones, or cellular telephones. Thus, the type of computer-based device should not be used to limit the scope of the present invention.

It should be noted that current methods tend to constrain the way in which online media is purchased. Traditionally, for example, digital goods have been associated with online purchasing, since a network connection is required in order to access these goods. From an end user's perspective, however, the present invention's method is more convenient and simple, as the method by which people purchase digital goods is independent of the mechanism by which the goods are delivered. When browsing CDs at a record store, for example, it should be possible to purchase music and have it delivered using either physical media or as purely digital data through a network-attached device.

Similarly, the type of device used to purchase digital goods should be independent of the device used to access these goods. It should be possible, for example, to use a wireless web device to purchase a high-resolution video regardless of whether the device has sufficient bandwidth to view the video or enough storage capacity to save it locally. The consumer may wish to purchase the video for later viewing on another device with a higher speed connection or may simply want to automatically download the content to another device such as a home server. Such an approach gives the consumer greater flexibility in when and where content is purchased and provides retailers with more opportunities to market and sell their online content.

Figure 6:
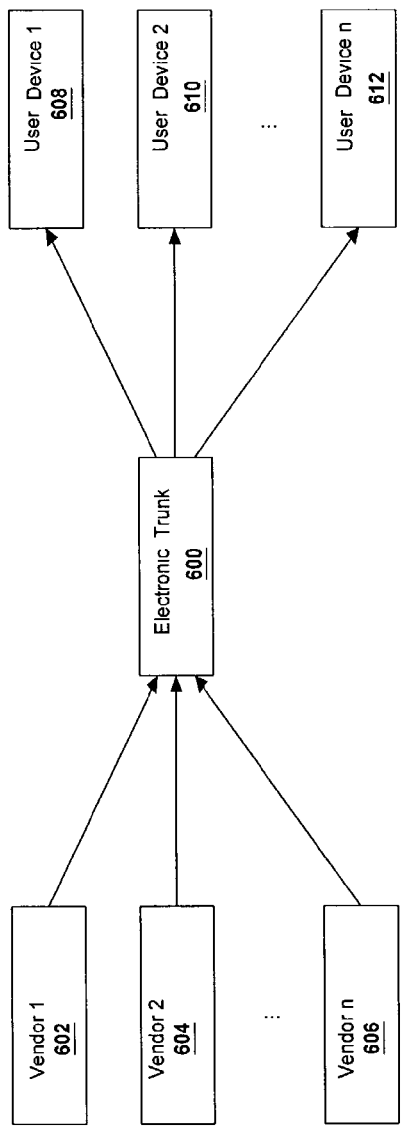
FIG. 6 illustrates the present invention functioning as the middleman between one or more vendors and a user's computer-based device.

FIG. 6 illustrates a general overview of the electronic trunk 600 of the present invention, wherein the electronic trunk 600 acts as the middleman between one or more vendors 602, 604, 606 and the user's computer-based devices 608, 610, 612.

Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage device.

Implemented in computer program code-based products are software modules for: authenticating a content provider; receiving at least one parameter unique to a consumer, a copy of digital data content (or pointer to such data) requested by said consumer, and a digital rights policy associated with said digital data content defining said consumer's access to said digital data content; identifying a unique storage space associated with said consumer based upon said unique parameter; transferring said received digital data content and digital rights policy to said unique storage space; and providing said consumer with access to said transferred digital data content in said unique storage space, wherein said customer's future access to said transferred digital data content is defined by said digital rights policy.

CONCLUSION

A system and method has been shown in the above embodiments for managing access to digital content via digital rights policies. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by software/program, computing environment, specific computing hardware, location of data content, type of network over which the content repository is accessed, or type of interface.

The above enhancements are implemented in various computing environments. For example, the present invention may be implemented on a conventional IBM PC, server, or equivalent, multi-nodal system (e.g., LAN), or networking system (e.g., Internet, WWW, wireless web). All programming, GUIs, and data related thereto are stored in computer memory, static or dynamic, and may be retrieved by the user in any of: conventional or mass computer storage, display (i.e., CRT), and/or hardcopy (i.e., printed) formats. The programming of the present invention may be implemented by one of skill in the art of database management.

The invention claimed is:

1. A method, comprising:

receiving, at a server, a parameter unique to a consumer and content requested by the consumer;

identifying, by the server, a unique storage space that is associated with the consumer based upon the parameter unique to the consumer;

associating, by the server, the parameter to the unique storage space;

storing, by the server, the content in the unique storage space;

providing, by the server, access to the content in the unique storage space, and receiving and storing, by the server, the content requested by the consumer in the unique storage space as a result of a successful consumer authentication prior to the consumer requesting access the content.

2. The method of claim 1, further comprising receiving a digital rights policy associated with the content, the digital rights policy defining the access to the content.

3. The method of claim 1, further comprising receiving an account number as the parameter.

4. The method of claim 3, further comprising associating the account number to the unique storage space.

5. The method of claim 1, further comprising providing different levels of the access to the content.

6. The method of claim 1, further comprising processing a financial transaction.

7. A system, comprising:

a server; and a memory storing code that when executed causes the server to perform operations, the operations comprising:

receiving a parameter, digital data content, and a digital rights policy associated with the digital data content, the parameter unique to a consumer requesting the digital data content, and the digital rights policy defining access to the digital data content;

identifying, in a content repository, a unique storage space associated with the consumer based upon the parameter unique to the consumer;

storing the digital data content in the unique storage space; and providing the access to the digital data content in the unique storage space.

8. The system of claim 7, wherein the operations further comprise receiving an account number as the parameter.

9. The system of claim 8, wherein the operations further comprise associating the account number to the unique storage space.

10. The system of claim 7, wherein the operations further comprise providing different levels of the access to the digital data content.

11. The system of claim 7, wherein the operations further comprise processing a financial transaction.

12. The system of claim 7, wherein the operations further comprise authenticating the consumer.

13. The system of claim 7, wherein the operations further comprise manipulating the digital data content.

14. The system of claim 7, wherein the operations further comprise renewing the digital rights policy.

15. The system of claim 7, wherein the operations further comprise expiring the digital rights policy.

16. A memory storing server-executable code that, when executed by a server, causes the server to perform operations, the operations comprising:

receiving a parameter, digital data content, and a digital rights policy associated with the digital data content, the parameter unique to a consumer requesting the digital data content, and the digital rights policy defining access to the digital data content;

identifying, in a content repository, a unique storage space associated with the consumer based upon the parameter unique to the consumer;

storing the digital data content in the unique storage space; and providing the access to the digital data content in the unique storage space.

17. The memory of claim 16, wherein the operations further comprise receiving an account number.

18. The memory of claim 17, wherein the operations further comprise associating the account number to the unique storage space.

19. The memory of claim 16, wherein the operations further comprise providing different levels of the access to the digital data content.

20. The memory of claim 16, wherein the operations further comprise processing a financial transaction.

* * * * *